(12) United States Patent
Wolf et al.

(10) Patent No.: US 6,390,716 B1
(45) Date of Patent: May 21, 2002

(54) PIVOTAL FASTENING ARRANGEMENT OF A FASTENING ELEMENT ON A BEARING JOURNAL

(75) Inventors: Herbert Wolf; Helge Siegner, both of Altdorf (DE)

(73) Assignee: SUSPA Holding GmbH, Altdorf (DE)

( * ) Notice: Subject to any disclaimer, the term of this patent is extended or adjusted under 35 U.S.C. 154(b) by 50 days.

(21) Appl. No.: 09/584,670

(22) Filed: Jun. 1, 2000

(30) Foreign Application Priority Data

Jun. 5, 1999 (DE) .......................... 199 25 743

(51) Int. Cl.⁷ .................................. F16J 1/14
(52) U.S. Cl. .................. 403/62; 403/315; 403/154; 92/187
(58) Field of Search .................. 403/154, 62, 315, 403/316, 326; 92/187

(56) References Cited

U.S. PATENT DOCUMENTS 3,564,978 A   2/1971 Flitz
3,765,307 A * 10/1973 Neel, Jr. .................. 92/187
5,632,059 A *  5/1997 Lee ..................... 403/154 X
6,276,260 B1 * 8/2001 Bianchi .................. 92/187

FOREIGN PATENT DOCUMENTS

| DE | 2351442 | 4/1975 |
| DE | 3228674 | 2/1984 |
| DE | 2904392 | 11/1988 |
| DE | 3325722 | 1/1992 |
| DE | 4139940 | 6/1993 |
| DE | 4341436 | 2/1995 |

* cited by examiner

Primary Examiner—Lynne H. Browne
Assistant Examiner—John R. Cottingham
(74) Attorney, Agent, or Firm—Browdy and Neimark

(57) ABSTRACT

An object is to be mounted by two fastening elements. A fastening element comprises an inlet, which extends at an angle relative to a receptacle lodging a bearing journal, and which allows the fastening element to be placed crosswise on the bearing journal.

6 Claims, 2 Drawing Sheets

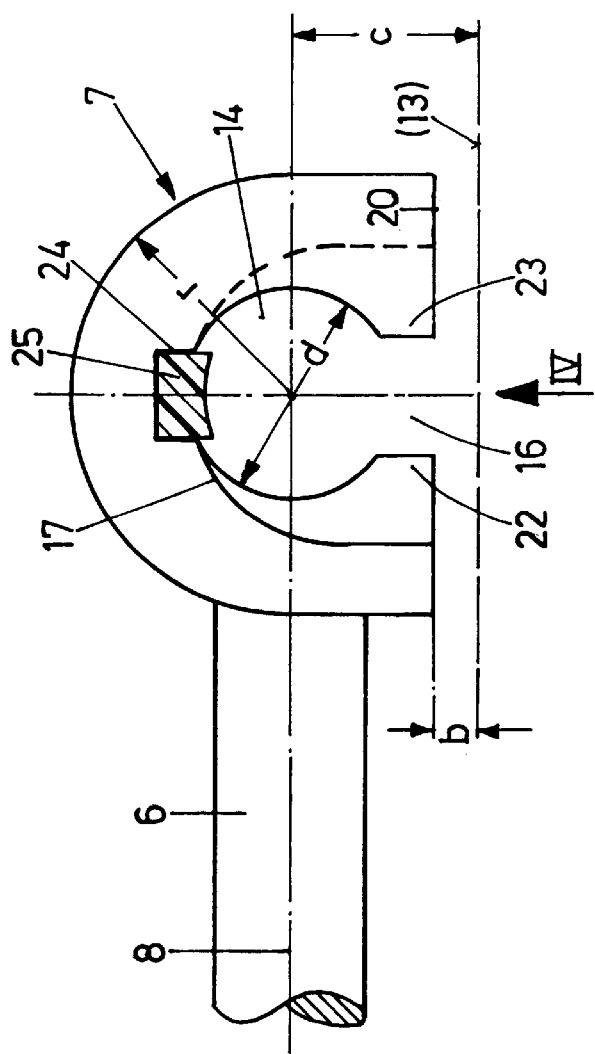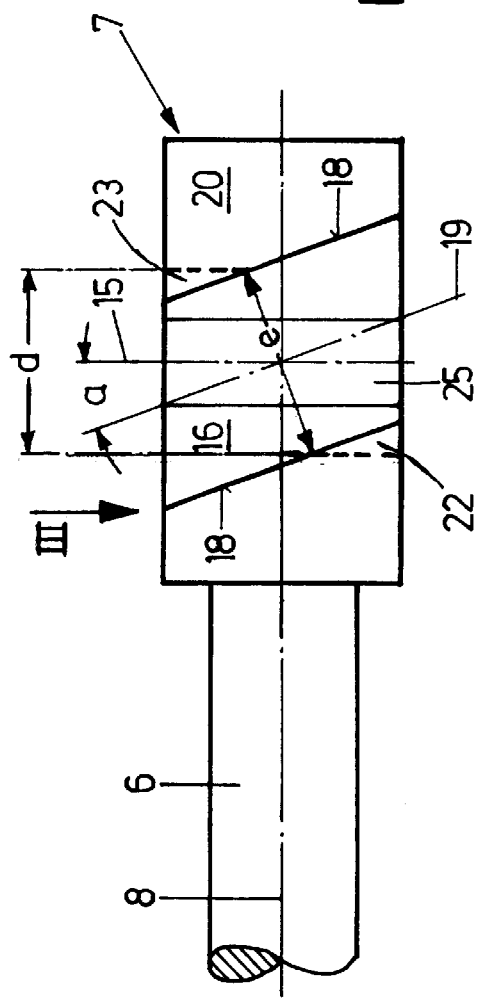

PIVOTAL FASTENING ARRANGEMENT OF A FASTENING ELEMENT ON A BEARING JOURNAL

BACKGROUND OF THE INVENTION

1. Field of the Invention

The invention relates to a pivotal fastening arrangement of a fastening element on a cylindrical bearing journal, the fastening element being joined to a unit, such as a gas spring, a shock absorber, a rod or the like.

2. Background Art

Fastening arrangements of the generic type generally comprise a so-called eye as a fastening element which the bearing journal is pushed through; the bearing journal is then united with the link member to which the unit is to be articulated. There may be cases in which the bearing journal is tightly joined to the link member, i.e. in which it is not possible to push the bearing journal through the fastening element during assembly. Further, cases are conceivable in which, for lack of space, the bearing journal cannot be encompassed entirely by the fastening element.

SUMMARY OF THE INVENTION

It is an object of the invention to embody a pivotal fastening arrangement of the type specified at the outset, which enables a fastening element to be mounted on the bearing journal even when the bearing journal is stationary and/or in the case of lack of space.

According to the invention, this object is attained by the features of claim 1. The design of the fastening element ensures that, after being pivoted out of its final position, the fastening element is placed on the bearing journal at right angles to the center axis of its inlet, where it is locked in place on the bearing journal by being pivoted back into the final position so that the required pivoting motions of the fastening element about the bearing journal are possible while the fastening element is safely retained on the bearing journal at right angles to the center axis thereof.

Further features, advantages and details of the invention will become apparent from the description of an embodiment, taken in conjunction with the drawing.

BRIEF DESCRIPTION OF THE DRAWING

FIG. 3 is a view of a fastening element on an enlarged scale in accordance with the arrow III of FIG. 4; and FIG. 4 is a view of the fastening element in accordance with the arrow IV of FIG. 3.

DESCRIPTION OF THE PREFERRED EMBODIMENT

Figure 1:
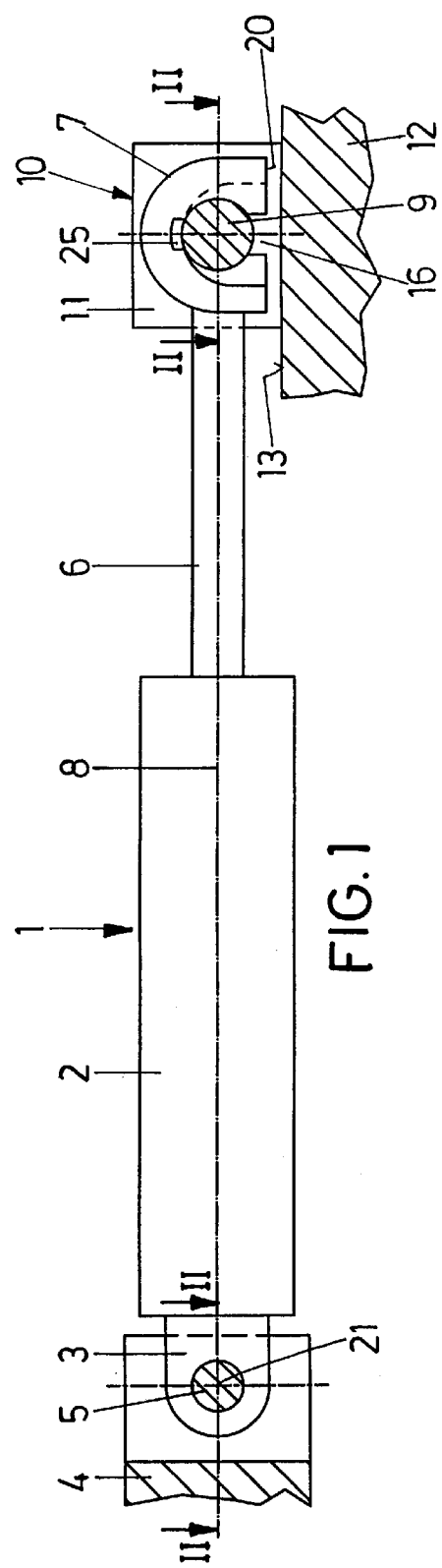
FIG. 1 is a lateral view of a piston-cylinder unit mounted by means of two fastening elements.
Figure 2:
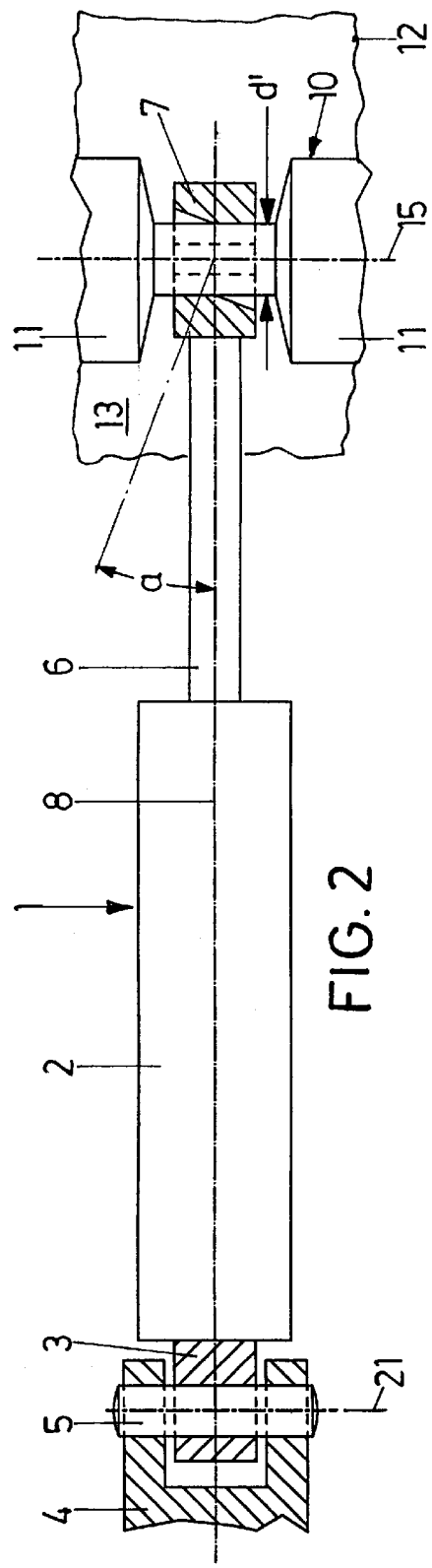
FIG. 2 is a plan view of the piston-cylinder unit with fastening elements in an illustration broken away in accordance with the lines II—II in FIG. 1.

FIGS. 1 and 2 illustrate a piston-cylinder unit 1, the substantially cylindrical casing 2 of which comprises, at its closed end, a fastening element 3 of the type of a so-called eye, which is pivotally fixed to a receiving member 4 by means of a pivot 5. A piston rod 6 is extended out of the end of the casing 2 that is turned away from the fastening element 3; the free end of the piston rod 6 comprises a fastening element 7 (still to be described in detail) which is to be fixed to a cylindrical bearing journal 9 disposed at right angles to the central longitudinal axis 8 of the unit 1. The cylindrical bearing journal 9 is part of a bearing 10, the cheeks 11 of which are mounted on a link member 12 and support the cylindrical bearing journal 9. The unit 1 is a gas spring or a damper.

The fastening element 7, details of which are illustrated in FIGS. 3 and 4, is of the type of a claw that is open towards the surface 13 turned thereto of the link member 12. It comprises a partially cylindrical bearing-journal receptacle 14, the diameter d of which exceeds the diameter d' of the cylindrical bearing journal 9 only by the clearance of 0.2 to 0.3 mm necessary for manufacturing implementation. Once the unit 1 has been mounted, the center axis 15 of this bearing-journal receptacle 14 is identical with the axis 15 of the cylindrical bearing journal 9.

An inlet 16 is provided in the fastening element 7; it is U-shaped—as seen in FIGS. 1 and 3—in the form of an upside-down U. The bottom 17 of the inlet 16 is semi-cylindrical, having a diameter d which is identical with the diameter d of the receptacle 14. The limiting walls 18 of the inlet 16 are parallel to each other, extending perpendicular to the central longitudinal axis 8 and at an angle a of 5° to 10°, preferably approximately 8°, to the axis 15. The receptacle 14 and the inlet 16 are produced in such a way that, for example, the receptacle 14 is drilled first as a fully cylindrical hole and the inlet 16 is machined subsequently by means of a cylinder milling cutter which rotates parallel to the center axis 19 of the inlet 16, starting from the surface 13 of the associated front end 20 of the claw-type fastening element 7 and advancing into the fastening element 7 until the center axis 19 also passes through the point of intersection of the center axis 15 and the axis 8, in which case the center axis 21 of the pivot 5, the axis 8 and the axes 15 and 19 lie in a common plane.

This superposition of the inlet 16 and the bearing-journal receptacle 14 helps attain that the claw-type fastening element 7 can be slipped on a bearing journal 9 when the unit 1 is pivoted crosswise such that its central longitudinal axis 8 is pivoted by the angle a as compared to its final position seen in FIG. 2 in the plane spanned by the axes 8, 15, 19, 21 so that the fastening element 7 can be slipped on the bearing journal 9 from above until the bottom 17 of the fastening element 7 rests on the bearing journal 9. When the unit 1 is again pivoted by the angle a into its final position, seen in FIG. 2, of the central longitudinal axis 8, then the projections 22, 23 back up the bearing journal 9 on the side turned to the surface 13 of the link member 12. These projections 22, 23 have not been removed in the vicinity of the front end 20 of the claw-type fastening element 7. They encompass the bearing journal 9 by an amount greater than the difference of d and d'. The bearing-journal receptacle 14 is more than semi-cylindrical and less than fully cylindrical. It is not possible to pull the fastening element 7 off the surface 13 turned thereto. Pivoting motions of the unit 1 about the center axis 19 are feasible to an extent given by the distance b of the front end 20 from the surface 13, it being possible to still influence this possibility of pivoting by the shaping of the front end 20 and the shape of the surface 13, respectively.

The described embodiment is of importance in particular when the distance c of the center axis 15 from the surface 13 is smaller than the radius r from the axis 15 to the outside of the fastening element 9. Further, this embodiment can be employed to advantage when the bearing journal 9 cannot be mounted by insertion into the fastening element 7, but is stationary, for example on cast parts.

A prerequisite for the type of assembly specified resides in that the unit 1 can be deflected laterally by the angle a when the fastening element 7 is mounted on the bearing journal 9. Installing the pivot 5 takes place after the described mounting of the fastening element 7 on the bearing journal 9. In this way, the unit 1 is held in the shown final position of the axis 8, whereby the mounting of the fastening element 7 on the bearing journal 9 is ensured.

For compensation of the mentioned play between the bearing journal 9 and the bearing-journal receptacle 14, a groove 24, which is open toward the receptacle 14, is formed in parallel to the axis 15 on the bottom 17 in the fastening element 7; disposed in the groove 24 is a clearance-compensation strip 25 of flexibly yielding material, such as an elastomer, in particular a polyurethane foam, which may additionally be soaked with a lubricant and which, in the non-deformed condition, projects beyond the groove 24 into the receptacle 14. This clearance-compensation strip 25 forces the fastening element 7 upwards away from the surface 13 of the link member 12 so that the bearing journal 9 bears free from play against the projections 22, 23, i.e. it does not clatter.

What is claimed is:

1. A pivotal fastening arrangement of a fastening element (7), which is joined to a unit (1), on a cylindrical bearing journal (9) of a diameter d', wherein the fastening element (7) comprises a bearing-journal receptacle (14) of a shape more than semi-cylindrical and less than fully cylindrical, which has a center axis (15) and a diameter d;

wherein an axis (8) of the unit (1) and the center axis (15) of the bearing-journal receptacle (14) define a plane;

wherein a U-shaped inlet (16) is formed in the fastening element (7) for leading in the bearing journal (9) at right angles to the plane, the inlet (16) having a semi-cylindrical bottom (17) of a diameter d which corresponds to the diameter d of the bearing-journal receptacle (14), and limiting walls (18) parallel to each other at a distance e which corresponds to the diameter d of the bearing-journal receptacle (14);

wherein the semi-cylindrical bottom (17) of the inlet (16) has a center axis (19) which is disposed in the plane, having a common point of intersection with the axis (8) of the unit (1) and the center axis (15) of the bearing-journal receptacle (14);

wherein an angle a is formed between the center axis (19) of the inlet (16) and the center axis (15) of the bearing-journal receptacle (14);

wherein a $5° \leq a \leq 10°$ applies to the angle a between the center axis (19) of the inlet (16) and the center axis (15) of the bearing-journal receptacle (14).

2. A pivotal fastening arrangement according to claim 1, wherein r>c applies to the radius r as from the center axis (15) of the bearing-journal receptacle (14) to the outside of the fastening element (3) in relation to the distance c of the center axis (15) from a surface (13), turned to the inlet (16), of a link member (12) which supports the bearing journal (9).

3. A pivotal fastening arrangement according to claim 1, wherein the bearing journal (9) is tightly mounted on a link member (12).

4. A pivotal fastening arrangement according to claim 1, wherein on a side of the inlet (16), the fastening element (7) partially encompasses the bearing journal (9) by projections (22, 23).

5. A pivotal fastening arrangement according to claim 1, wherein a flexible clearance-compensation member (25) is disposed on a side of the bearing-journal receptacle (14) that is turned away from the inlet (16).

6. A pivotal fastening arrangement according to claim 2, wherein a $\cong 8°$ applies to the angle a between the center axis (19) of the inlet (16) and the center axis (15) of the bearing-journal receptacle (14).

* * * * *